United States Patent [19]
Glance et al.

[11] Patent Number: 4,510,595
[45] Date of Patent: Apr. 9, 1985

[54] MODIFIED TIME-DIVISION TRANSMISSION TECHNIQUE FOR DIGITAL MOBILE RADIO SYSTEMS

[75] Inventors: Bernard Glance, Colts Neck; Lawrence J. Greenstein, Edison, both of N.J.

[73] Assignee: AT&T Bell Laboratories, Murray Hill, N.J.

[21] Appl. No.: 538,329

[22] Filed: Oct. 3, 1983

[51] Int. Cl.³ .............................................. H04J 4/00
[52] U.S. Cl. .................................... 370/32; 370/50; 370/29; 370/30
[58] Field of Search ............... 370/30, 32, 69.1, 29, 370/50, 1, 2, 3, 4; 375/2.2

[56] References Cited
U.S. PATENT DOCUMENTS

| Re. 31,510 | 1/1984 | Carbrey | 370/50 |
|---|---|---|---|
| 3,696,421 | 10/1972 | Bitler | 343/100 |
| 4,105,973 | 8/1978 | Arnold et al. | 325/4 |
| 4,131,849 | 12/1978 | Freeburg et al. | 325/54 |
| 4,267,592 | 5/1981 | Craiglow | 370/29 |
| 4,383,332 | 5/1983 | Glance et al. | 455/33 |

FOREIGN PATENT DOCUMENTS

| 483426 | 5/1952 | Canada | 370/29 |
|---|---|---|---|
| 2023972A | 6/1979 | United Kingdom | 370/30 |

OTHER PUBLICATIONS

Proceedings of the IRE, vol. 44, No. 12, Dec. 1956, "A Third Method of Generation and Detection of Single--Sideband Signals", by D. K. Weaver, Jr., pp. 1703-1705.

Primary Examiner—Joseph A. Orsino, Jr.
Assistant Examiner—Timothy K. Greer
Attorney, Agent, or Firm—Erwin W. Pfeifle

[57] ABSTRACT

The present invention relates to a time-division radio transmission technique which uses a modified full-duplex arrangement where two channels are assigned to each two-way link. Simultaneous two-way transmission includes sequential digital symbol bursts between two remote transceivers which alternate between a first and a second channel centered on a first and a second radio frequency, respectively, with each transceiver using a different one of the channels at any instant of time.

9 Claims, 2 Drawing Figures

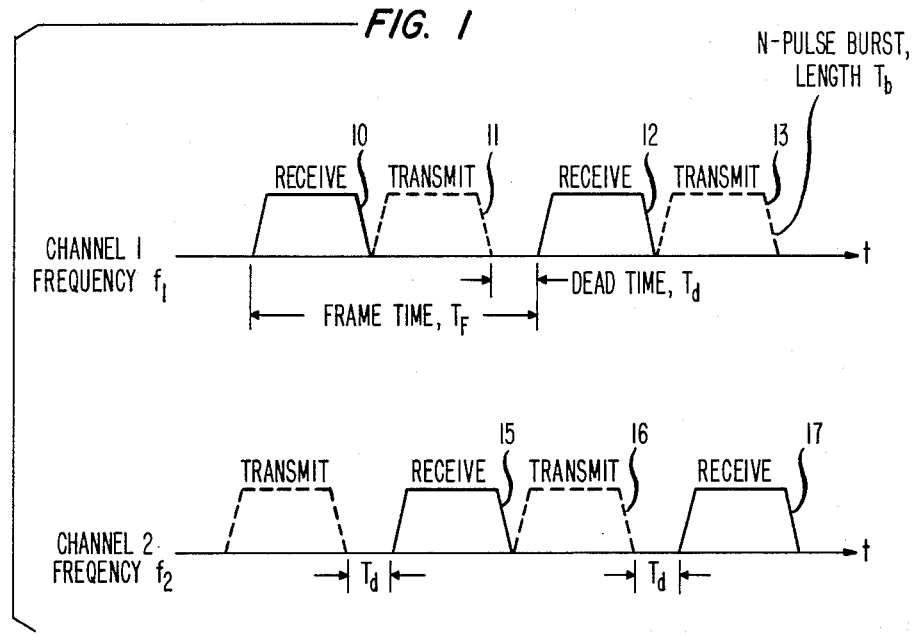
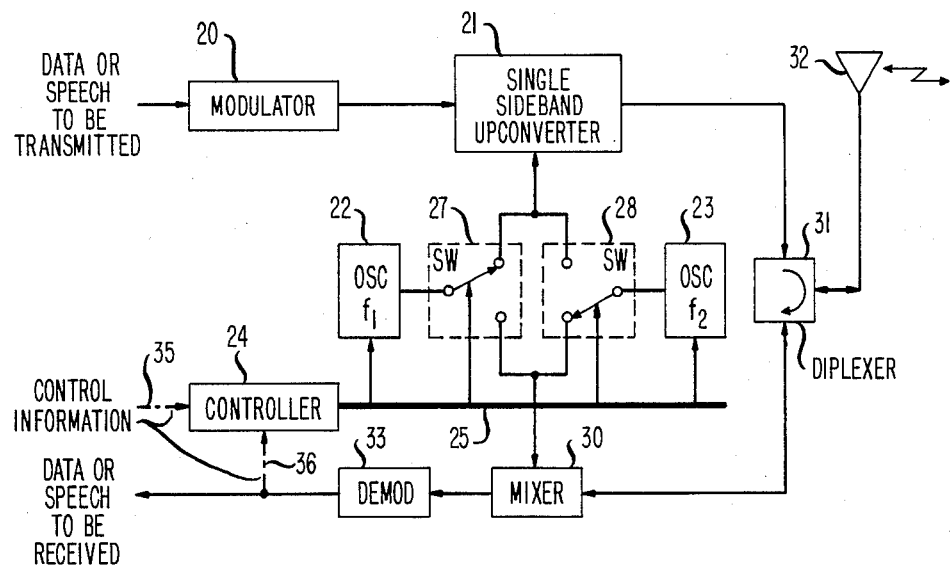

ns of the two channels, with
each station using a different one of the channels at any
instant of time.

MODIFIED TIME-DIVISION TRANSMISSION TECHNIQUE FOR DIGITAL MOBILE RADIO SYSTEMS

BACKGROUND OF THE INVENTION

1. Field of the Invention

The present invention relates to a time-division transmission technique for use in, for example, digital mobile radio systems and, more particularly, to a transmission technique which uses a modified full-duplex arrangement where two channels are assigned to each base-mobile link. Simultaneous two-way transmission is provided by transmitting sequential bursts from the base and mobile stations which are alternated between the first and second frequencies of the two channels, with each station using a different one of the channels at any instant of time.

2. Description of the Prior Art

In mobile radio systems using time-division retransmission (TDR), the base-to-mobile and mobile-to-base links share the same frequency channel in a time-division manner. As shown, for example, in U.S. Pat. No. 4,383,332 issued to B. Glance et al on May 10, 1983, because of channel reciprocity, the diversity processing for both directions of transmission can be done at the base station alone, thus permitting the use of a single antenna and simplified circuitry at the mobile. In such TDR systems, however, it was found that the influence of the rms delay spread ($\tau_o$) of the multipath medium provided a sharp decline in detection performance where the delay spread is greater than 25% of the symbol period, T. More specifically, the delay spread is defined as the spread in arrival times at the receiver of a symbol burst in travelling the multipath routes between the transmitter and receiver.

For TDR using 32-kb/s encoding and 4-PSK modulation, T is approximately 28 microseconds, so that frequency selectivity becomes important if $\tau_o > 7$ microseconds. For 2-PSK modulation, this threshold $\tau_o$ would be 3.5 microseconds. The condition where the delay spread is greater than 25% of the symbol period is found to occur often enough and with sufficient repeatability to be regarded seriously. One possible conclusion is that system design objectives should emphasize long symbol periods, T.

The problem remaining in the prior art is to provide a transmission technique which will permit longer symbol periods, to lower the relative rms delay spread (J/T) while avoiding reduced system capacity.

SUMMARY OF THE INVENTION

The foregoing problem has been solved in accordance with the present invention which relates to a time-division transmission technique for use in, for example, digital mobile radio systems and, more particularly, to a transmission technique which uses a modified full-duplex arrangement where two channels are assigned to each base-mobile link. Simultaneous two-way transmission is provided by transmitting sequential symbol bursts from the base and mobile stations which are alternated between the first and second frequencies of the two channels, with each station using a different one of the channels at any instant of time.

It is an aspect of the present invention to provide a transmission technique employing a modified full-duplex transmission arrangement so that the symbol period can be twice that found in the prior art single channel, time-division retransmission, mobile radio systems. The present technique can lower the relative rms delay spread found in such systems by a factor of 2, and either improve speech reception or, alternately, reduce the number of diversity branches while also providing reduced possibility of multipath fading on both channels simultaneously.

Other and further aspects of the present invention will become apparent during the course of the following description and by reference to the accompanying drawings.

BRIEF DESCRIPTION OF THE DRAWINGS

Referring now to the drawings:

FIG. 1 illustrates a transmit and receive burst sequence at one of the remotely located transceivers; and FIG. 2 is a block diagram of an exemplary transceiver in accordance with the present invention for implementing the transmit and receive format of FIG. 1.

DETAILED DESCRIPTION

In accordance with the present invention, the modified time-division transmission system for use in, for example, a mobile radio transmission system has two frequency channels selectively assigned to each base-mobile link during a call. One of the channels is centered on, for example, the carrier frequency $f_1$ and the other channel is centered on, for example, the carrier frequency $f_2$. The transmission technique is best explained by referring to FIG. 1 which illustrates a preferred transmit and receive burst sequence at, for example, the base station relative to time.

In FIG. 1, the top line shows the burst sequence for channel 1 centered on frequency $f_1$. At the left side of the top line, an N-pulse burst 10 is received by the base station from the mobile via channel 1 and, immediately following its reception, an N-pulse burst 11 is transmitted back to the mobile via channel 1. The mobile waits for an inter-burst dead time period, $T_d$, before receiving its next N-pulse burst 12 from the mobile via channel 1. When burst 12 is received by the base station the process is repeated and N-pulse burst 13 is transmitted immediately to the mobile.

The same procedure occurs for channel 2 centered at frequency $f_2$ as occurred for channel 1, as shown on the lower line of FIG. 1. However, the patterns for channels 1 and 2 are offset from the another in time in a way that is advantageous. More particularly, in the sequence of received bursts from the mobile, there is a guard time for each switch from channel 1 to channel 2 and an approximately equal guard time for each switch from channel 2 to channel 1. The same condition applies to the sequence of transmitted bursts to the mobile.

From FIG. 1 it can be seen that in the time domain a burst 10 is received from the mobile via channel 1 and immediately thereafter a burst 11 is transmitted back to the mobile via channel 1. During the transmission of burst 11, a burst 15 is received by the base station from the mobile via channel 2 at a predetermined guard time period after the conclusion of burst 10 on channel 1. Immediately after the reception of burst 15 on channel 2, the base station transmits a N-pulse burst 16 back to the mobile via channel 2. During the transmission of burst 16, and after a predetermined guard time from the end of burst 15, the base station receives burst 12 from the mobile via channel 1 and immediately transmits burst 13 back to the mobile on channel 1. During the transmission of burst 13, the base station receives a burst 17 from the mobile on channel 2, and the above-described sequence continues.

A corresponding sequence for the mobile station can be easily constructed from the sequence of FIG. 1. Except for small time shifts related to the base-to-mobile distance, the diagram would be identical of FIG. 1 with the labels "TRANSMIT" and "RECEIVE" interchanged. From the above description it should become apparent that a modified full-duplex technique is being used where two-way communication between the base station and the mobile station uses two channels but sequential transmissions from each station alternate between the two channels, with each station using a different one of the two channels for transmission and reception at any instant of time.

An exemplary transceiver for practicing the above-described transmission technique is shown in FIG. 2. There, data or speech to be transmitted is modulated in a modulator 20 into a predetermined signal format and transmitted to a single-sideband upconverter means 21. Upconverter means 21 functions to mix the output signal from modulator 20 with either one of the output carrier frequencies $f_1$ or $f_2$ from oscillators 22 and 23, respectively, and generate an output signal comprising only a single sideband of the mixed signals at the proper upconverted frequency band. It is to be understood that such single-sideband upconverter means are well known and any suitable arrangement can be used as, for example, the arrangement shown in the article "A Third Method of Generation and Detection of Single-Sideband Signals" by D. K. Weaver, Jr. in Proceedings of the IRE, Vol. 44, No. 12, December 1956 at pages 1703–1705.

A controller 24 functions to send control signals via a bus 25 to oscillators 22 and 23 to initially select which pair of carrier frequencies $f_1$ and $f_2$, of the many possible pairs of carrier frequencies associated with the system, the oscillators 22 and 23, respectively, will provide during the duration of a particular call. Controller 24 also functions to send a predetermined sequence of timed control signals on bus 25 to a first and a second switching means 27 and 28, respectively. Such control signals are provided such that at any instant of time, switching means 27 connects the output carrier frequency from oscillator 22 to upconverter means 21 while switching means 28 connects the output signal from oscillator 23 to a mixer 30 in the receive path, and vice versa during the next burst period. In this manner the transmission and reception of signals to and from a remote mobile can alternate between the two selected carrier frequencies supplied by oscillators 22 and 23 to achieve the format of FIG. 1. The resultant output signal from single-sideband upconverter means 21 is transmitted to a diplexer 31 which directs the output upconverted sideband signal from upconverter means 21 to an antenna 32 for transmission to the remote mobile.

The RF signal from the remote mobile is received at antenna 32 and is directed to mixer 30 in the receive path via diplexer 31. Mixer 30 mixes the input signal from diplexer 31 with the carrier frequency supplied by either one of oscillators 22 and 23 via switching means 27 and 28, respectively, at any instant of time to provide a downconverted signal to, for example, an IF frequency band where a demodulator 33 returns the received downconverted signal to either the proper data or speech signal format for transmission to an end user. Essentially, demodulator 33 functions in the reverse manner of modulator 20.

It is to be understood that controller 24 can initially be set, or continually updated, via local signals over path 35, or as part of a received transmission from a remote source over path 36, to reflect dynamic conditions relating to the pair of frequencies to be generated by oscillators 22 and 23 for use by singlesideband upconverter means 21 and mixer 30, and the timing sequence for switching switching means 27 and 28 during the course of communication over the two-way link with a mobile.

What is claimed is:

1. A method of transmitting digital radio signal bursts between two remotely located transceivers on a time-division basis, the method comprising the steps of:
    at a first transceiver,
    (a) receiving a first digital signal burst from a second remote transceiver on a first channel centered on a first radio frequency;
    (b) after step (a), transmitting a second digital signal burst to the second remote transceiver on the first channel while concurrently receiving a third digital signal burst from the second remote transceiver on a second channel centered on a second radio frequency during at least a portion of the transmission period of the second signal burst, the second radio frequency being different than the first radio frequency;
    (c) after step (b), transmitting a fourth digital signal burst to the second remote transceiver on the second channel while concurrently receiving a fifth digital signal burst from the second remote transceiver on the first channel during at least a portion of the transmission period of the fourth signal burst; and
    (d) after step (c), repeating steps (b) and (c) for subsequent digital signal bursts six through nine corresponding in steps (b) and (c) to that of digital signal bursts two through five, respectively.

2. The method according to claim 1 wherein in performing steps (a) to (d), a predetermined dead time ($T_d$) is included between the transmission of a signal burst and the reception of a next signal burst on a same channel.

3. The method according to claim 1 wherein in performing steps (a) to (d) said first and second radio frequencies are a pair of carrier frequencies selected from a plurality of pairs of carrier frequencies associated with a particular radio system for use during the duration of a communication period between two remotely located transceivers.

4. A transceiver capable of communicating with a second remote transceiver using digital radio signal bursts on a time-division basis, the transceiver comprising:
    a transmitter section capable of transmitting sequential digital radio signal bursts to the second transceiver;
    a receiver section capable of receiving sequential digital radio signal bursts from the second transceiver; and
    means connected to the transmitter and receiver sections capable of implementing two-way communication with the second transceiver wherein sequential signal bursts to and from the second transceiver alternate between a first and a second channel centered on a first and a second radio frequency, respectively, with each direction of transmission using a different one of the two channels at any instant of time.

5. A transceiver according to claim 4 wherein the first and second radio frequencies are a pair of carrier frequencies selected from a plurality of pairs of carrier frequencies associated with a particular radio system for use during a communication period between two remotely located transceivers.

6. A transceiver according to claim 4 wherein said means for implementing two-way communication comprises:

means for activating the receiver section to receive a first signal burst from the second transceiver on the first channel and thereafter activating the transmitter section to transmit a second signal burst to the second transceiver on said first channel while concurrently, during a portion of the second signal burst, activating the receiver section to receive a third signal burst from the second transceiver on the second channel, and after the reception of the third signal burst to activate the transmitter section to transmit a fourth signal burst to the second transceiver on the second channel while concurrently, during a portion of the fourth signal burst, to activate the receiver section to receive a fifth signal burst from the second transceiver on the first channel.

7. A transceiver according to claim 6 wherein predetermined dead time, $T_d$, is included between the transmission of a signal burst by the transmitter section and the reception of a next signal burst by the receiver section on the same channel.

8. A transceiver according to claim 4 wherein the activating means comprises:

a first and a second oscillating means (22,23) capable of generating a first and a second carrier frequency, respectively, at an output thereof, and a first and second switching means (27,28) connected to the output of the first and second oscillating means, respectively, capable of alternately directing the output carrier frequencies from the first and second oscillator means to a separate one of the transmitter and receiver sections in response to a received control signal; and the means for implementing two-way communication further comprises:

a controller for generating predetermined control signals to the first and second switching means for concurrently directing the output from the first oscillator means via the first switching means to the transmitter section and the output from the second oscillator means via the second switching means to the receiver section during a first signal burst of the communication period, and for concurrently directing the output from the first oscillator means via the first switching means to the receiver section and the output from the second oscillator means via the second switching means to the transmitter section during a second signal burst of the communication period between the two transceivers, and thereafter repeating the switching sequence associated with the first and second signal bursts for subsequent signal bursts of the communication period.

9. A transceiver according to claim 8 wherein the first and second oscillating means are capable of selectively generating a first and a second carrier frequency associated with any pair of a plurality of pairs of carrier frequencies associated with a radio system in response to received control signals; and the controller is further capable of generating control signals to the first and second oscillating means for selecting a predetermined pair of first and second carrier frequencies to be generated by the first and second oscillator means, respectively, prior to the start of the communication period between the two remotely located transceivers.

* * * * *